United States Patent
Liu et al.

(10) Patent No.: US 8,145,129 B2
(45) Date of Patent: Mar. 27, 2012

(54) PORTABLE COMMUNICATION DEVICE HAVING MATCHING FUNCTION AND PORTABLE COMMUNICATION SYSTEM AND COMMUNICATION METHOD THEREFOR

(75) Inventors: Chen-Chen Liu, Taipei (TW); Yuan Zhou, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 588 days.

(21) Appl. No.: 12/292,592

(22) Filed: Nov. 21, 2008

(65) Prior Publication Data
US 2009/0156124 A1    Jun. 18, 2009

(30) Foreign Application Priority Data
Dec. 18, 2007    (TW) .............................. 96148532 A

(51) Int. Cl.
*H04B 7/00* (2006.01)
(52) U.S. Cl. ...................... 455/41.2; 455/41.1
(58) Field of Classification Search ............... 455/41.1, 455/41.2
See application file for complete search history.

(56) References Cited

U.S. PATENT DOCUMENTS

| | | | |
|---|---|---|---|
| 6,078,806 A * | 6/2000 | Heinonen et al. | 455/406 |
| 7,379,920 B2 * | 5/2008 | Leung et al. | 705/67 |
| 7,592,910 B2 | 9/2009 | Tuck et al. | |
| 7,640,186 B1 * | 12/2009 | Fraser et al. | 705/26.35 |
| 7,873,540 B2 * | 1/2011 | Arumugam | 705/17 |
| 7,969,301 B2 | 6/2011 | Tuck | |
| 8,019,365 B2 * | 9/2011 | Fisher | 455/466 |
| 2001/0037254 A1 * | 11/2001 | Glikman | 705/26 |
| 2007/0069890 A1 | 3/2007 | Tuck | |
| 2007/0196831 A1 | 8/2007 | Tuck et al. | |
| 2007/0243537 A1 | 10/2007 | Tuck et al. | |
| 2008/0139155 A1 * | 6/2008 | Boireau et al. | 455/296 |
| 2009/0075592 A1 * | 3/2009 | Nystrom et al. | 455/41.1 |

FOREIGN PATENT DOCUMENTS

TW    200737916    10/2007

* cited by examiner

*Primary Examiner* — Lincoln Donovan
*Assistant Examiner* — Adam Houston
(74) *Attorney, Agent, or Firm* — Bacon & Thomas, PLLC

(57) ABSTRACT

A portable communication device having a matching function and a portable communication system and a communication method thereof are provided. The portable communication device includes an operating interface, a wireless communication module, a determining unit and a displaying unit. The operating interface is capable of generating a first user data. The wireless communication module is capable of receiving a second user data transmitted by another portable communication device. The determining unit is capable of determining whether the first user data and the second user data satisfy a matching condition. The displaying unit is capable of showing a noticing figure if the first user data and the second user data satisfy the matching condition.

30 Claims, 2 Drawing Sheets

PORTABLE COMMUNICATION DEVICE HAVING MATCHING FUNCTION AND PORTABLE COMMUNICATION SYSTEM AND COMMUNICATION METHOD THEREFOR

This application claims the benefit of Taiwan application Serial No. 96148532, filed Dec. 18, 2007, the subject matter of which is incorporated herein by reference.

BACKGROUND OF THE INVENTION

1. Field of the Invention

The invention relates in general to a portable communication device and a portable communication system and a communication method thereof, and more particularly to a portable communication device having a matching function and a portable communication system and a communication method thereof.

2. Description of the Related Art

The portable communication device such as a mobile phone has gained great popularity. Let the mobile phone available in the market be taken for example. In addition to the communication function, some mobile phones have the functions of camera, audio recorder and calendar.

Except the communication function, other functions such as camera or audio recorder is for one single mobile phone only, and one user cannot interact with another user by means of the mobile phone. Thus, a device capable of increasing opportunities of interaction is provided, and the application of the device is made more personalized and diversified.

SUMMARY OF THE INVENTION

The invention is directed to a portable communication device having a matching function and a portable communication system and a communication method thereof for determining whether a first user data and a second user data satisfy a matching condition. The portable communication device displays a noticing figure if the first user data and the second user data satisfy the matching condition. Thus, a user of the portable communication device can have more opportunities to interact with another user of the other portable communication device. Besides, the invention makes the application of the portable communication device more interesting and diversified.

According to a first aspect of the present invention, a portable communication device having a matching function is provided. The portable communication device includes an operating interface, a wireless communication module, a determining unit and a displaying unit. The operating interface is capable of generating a first user data. The wireless communication module is capable of receiving a second user data transmitted by another portable communication device. The determining unit is capable of determining whether the first user data and the second user data satisfy a matching condition. The displaying unit is capable of showing a noticing figure if the first user data and the second user data satisfy the matching condition.

According to a second aspect of the present invention, a portable communication system having a matching function is provided. The portable communication system includes a first portable communication device and a second portable communication device. The first portable communication device includes a first operating interface, a first wireless communication module, a first determining unit and a first displaying unit. The first operating interface is capable of generating a first user data. The second portable communication device includes a second operating interface and a second wireless communication module. The second operating interface is capable of generating a second user data. The second wireless communication module is capable of transmitting the second user data to the first wireless communication module of the first portable communication device. The first determining unit is capable of determining whether the first user data and the second user data satisfy a first matching condition. The first displaying unit displays a first noticing figure if the first user data and the second user data satisfy the first matching condition.

According to a third aspect of the present invention, a communication method having a matching function is provided. Firstly, a first portable communication device is capable of generating a first user data. Next, the first portable communication device is capable of receiving a second user data transmitted by a second portable communication device. Then, the first portable communication device is capable of determining whether the first user data and the second user data satisfy a matching condition. Lastly, the first portable communication device displays a noticing figure if the first user data and the second user data satisfy the matching condition.

The invention will become apparent from the following detailed description of the preferred but non-limiting embodiments. The following description is made with reference to the accompanying drawings.

DETAILED DESCRIPTION OF THE INVENTION

Figure 1:
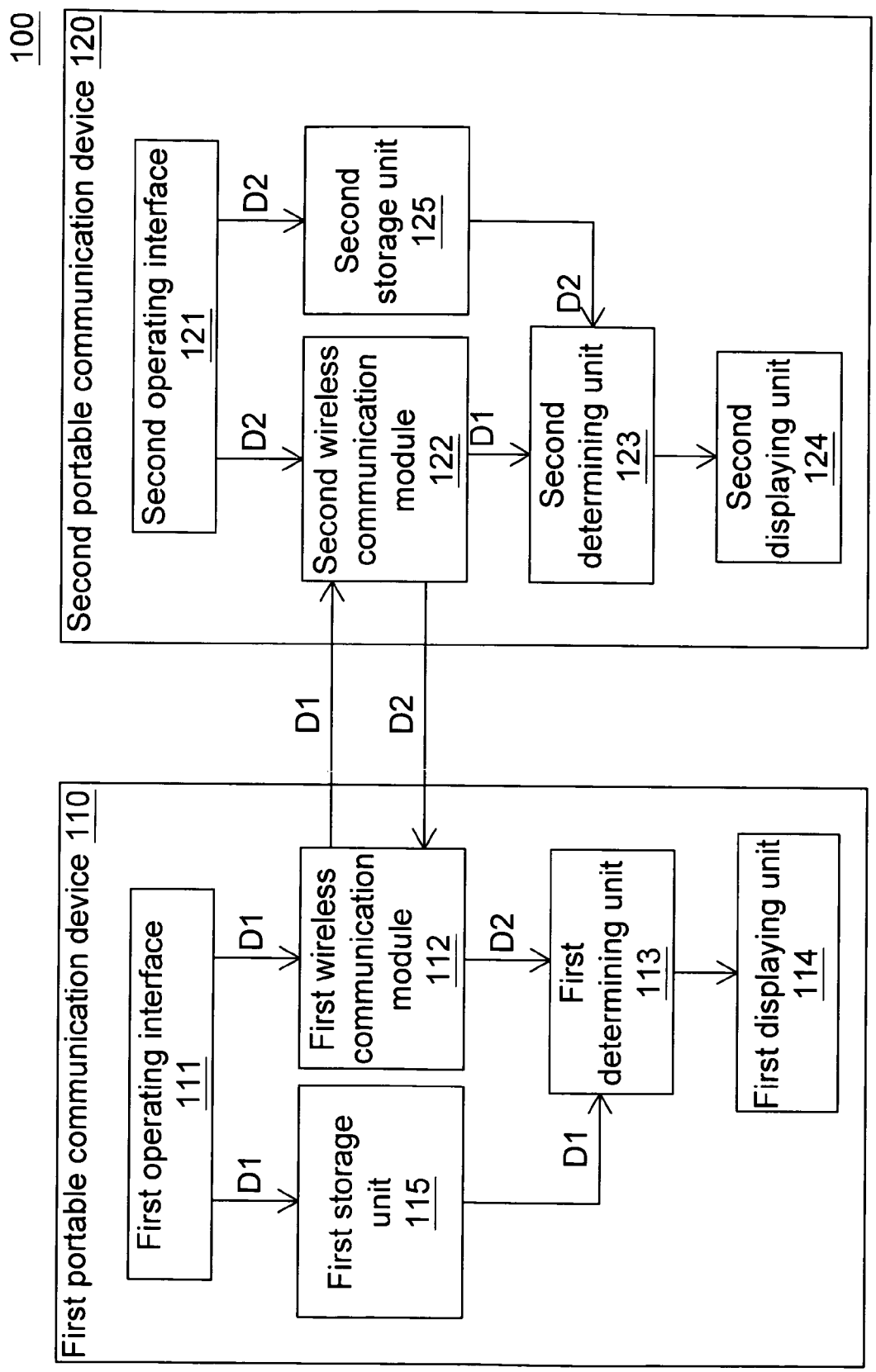
FIG. 1 shows a block diagram of a portable communication system having a matching function according to a preferred embodiment of the invention.

Referring to FIG. 1, a block diagram of a portable communication system 100 having a matching function according to a preferred embodiment of the invention is shown. The portable communication system 100 includes a first portable communication device 110 and a second portable communication device 120. The first portable communication device 110, such as a mobile phone, includes a first operating interface 111, a first wireless communication module 112, a first determining unit 113 and a first displaying unit 114. The first operating interface 111 is capable of generating a first user data D1. The first user data D1, such as a personal data inputted by a user A, includes age, gender, and hobby and so on. Furthermore, the first user data D1 may also include a matching condition inputted by the user A.

The second portable communication device 120, such as a mobile phone, includes a second operating interface 121 and a second wireless communication module 122. The second operating interface 121 is capable of generating a second user data D2. The second user data D2, such as a personal data inputted by another user B, includes age, gender, and hobby and so on. Furthermore, the second user data D2 may also include a matching condition inputted by a user B. The second wireless communication module 122 is capable of transmitting the second user data D2 to the first wireless communication module 112 of the first portable communication device 110. The first determining unit 113 is capable of determining whether the first user data D1 and the second user data D2 satisfy a first matching condition. The first matching condition may be a predetermined matching condition of the system. Furthermore, the first matching condition may be a matching condition inputted by the user A. The first displaying unit 114 displays a first noticing figure such as a heart pattern if the first user data D1 and the second user data D2 satisfy the first matching condition. The first displaying unit 114 is a liquid crystal display screen for example.

Thus, when the first displaying unit 114 displays the first noticing figure (such as the heart pattern), the user A of the first portable communication device 110 knows that the first wireless communication module 112 receives the second user data D2 satisfying the first matching condition. Thus, the user A of the first portable communication device 110 and the user B of the second portable communication device 120 have more opportunities to interact with each other.

As indicated in FIG. 1, the second wireless communication module 122 is further capable of receiving the first user data D1 transmitted by the first wireless communication module 112. The second portable communication device 120 further includes a second determining unit 123 and a second displaying unit 124. The second determining unit 123 is capable of determining whether the first user data D1 and the second user data D2 satisfy a second matching condition. The second matching condition may be a predetermined matching condition of the system. Furthermore, the second matching condition may be a matching condition inputted by the user B. The second displaying unit 124 is capable of showing a second noticing figure if the first user data D1 and the second user data D2 satisfy the second matching condition.

In the present embodiment of the invention, the first user data D1 and the second user data D2 respectively include at least one of hobby, marriage status, age and gender. Besides, the first portable communication device 110 further includes a first storage unit 115 capable of storing the first user data D1. The second portable communication device 120 further includes a second storage unit 125 capable of storing the second user data D2.

Besides, the first operating interface 111 and the second operating interface 121 respectively are further capable of generating a first matching condition and a second matching condition. Thus, the first matching condition and the second matching condition respectively satisfy individual needs of the user A and the user B according to their preferences.

Furthermore, the first user data D1 may include many first data items or a first matching condition set by the user. The second user data D2 may include many second data items or a second matching condition set by the user. No matter the first matching condition is predetermined in the system or set by the user, the first matching condition may include many matching items. The first determining unit 113 further compares each of the first data items with a corresponding second data item to determine whether the corresponding second data item satisfies the corresponding matching item. The first noticing figure is one of the many predetermined patterns respectively corresponding to the number of the second data items satisfying the corresponding matching item.

For example, the four first data items of the first user data D1 indicate that hobby is reading, gender is female, education is bachelor's degree, and domicile place is New York, and the four second data items of the second user data D2 indicate that hobby is watching movies, gender is male, education is bachelor's degree school, and domicile place is Los Angels. When the four matching items of the first matching condition respectively indicate that hobby is the same, gender is opposite, education is bachelor's degree and domicile place is New York, the first determining unit 113 determines that one of the second data items (gender is male) satisfies the corresponding matching item (gender is opposite). Thus, the first displaying unit 114 displays a predetermined pattern corresponding to satisfying one matching item. For example, a one-heart pattern is displayed.

In another example, the four first data items of the first user data D1 respectively indicate that hobby is reading, gender is female, education is bachelor's degree and domicile place is New York, and the four second data items of the second user data D2 respectively indicate that hobby is reading, gender is male, education is bachelor's degree and domicile place is New York. When the four matching items of the first matching condition respectively indicate that hobby is the same, gender is opposite, education is bachelor's degree and domicile place is New York, the first determining unit 113 determines that the four second data items all satisfy the corresponding matching items. Thus, the first displaying unit 114 displays a predetermined pattern corresponding to satisfying four matching items. For example, a four-heart pattern is displayed. Thus, the user A knows the matching degree with the user B according to the noticing figure displayed on the first displaying unit 114.

Likewise, the second matching condition includes many matching items. The second determining unit 123 of the second portable communication device 120 compares each of the second data items with the corresponding first data item to determine whether the corresponding first data item satisfies the corresponding matching item. A corresponding noticing figure is displayed on the second displaying unit 124 according to the number of the second data items satisfying the corresponding matching item. The larger the number of the second data items satisfying the corresponding matching item is, the higher the matching degree is. Thus, different patterns can be used to remind the user A and the user B of the matching degree.

In the present embodiment of the invention, the second portable communication device 120 is near to the first portable communication device 110. The first wireless communication module 112 and the second wireless communication module 122 are both short distance point-to-point wireless transmission modules such as Bluetooth modules. Thus, the first portable communication device 110 and the second portable communication device 120 transmit data within a distance of 10 meters. When the first displaying unit 114 displays the first noticing figure, the user A of the first portable communication device 110 knows that the user B of the second portable communication device 120 who matches the first matching condition is nearby. Thus, the user A knows that the right one is nearby and will pay more attention to the people around, and the user A will have more opportunities to interact with the one who matches with the first matching condition.

Figure 2:
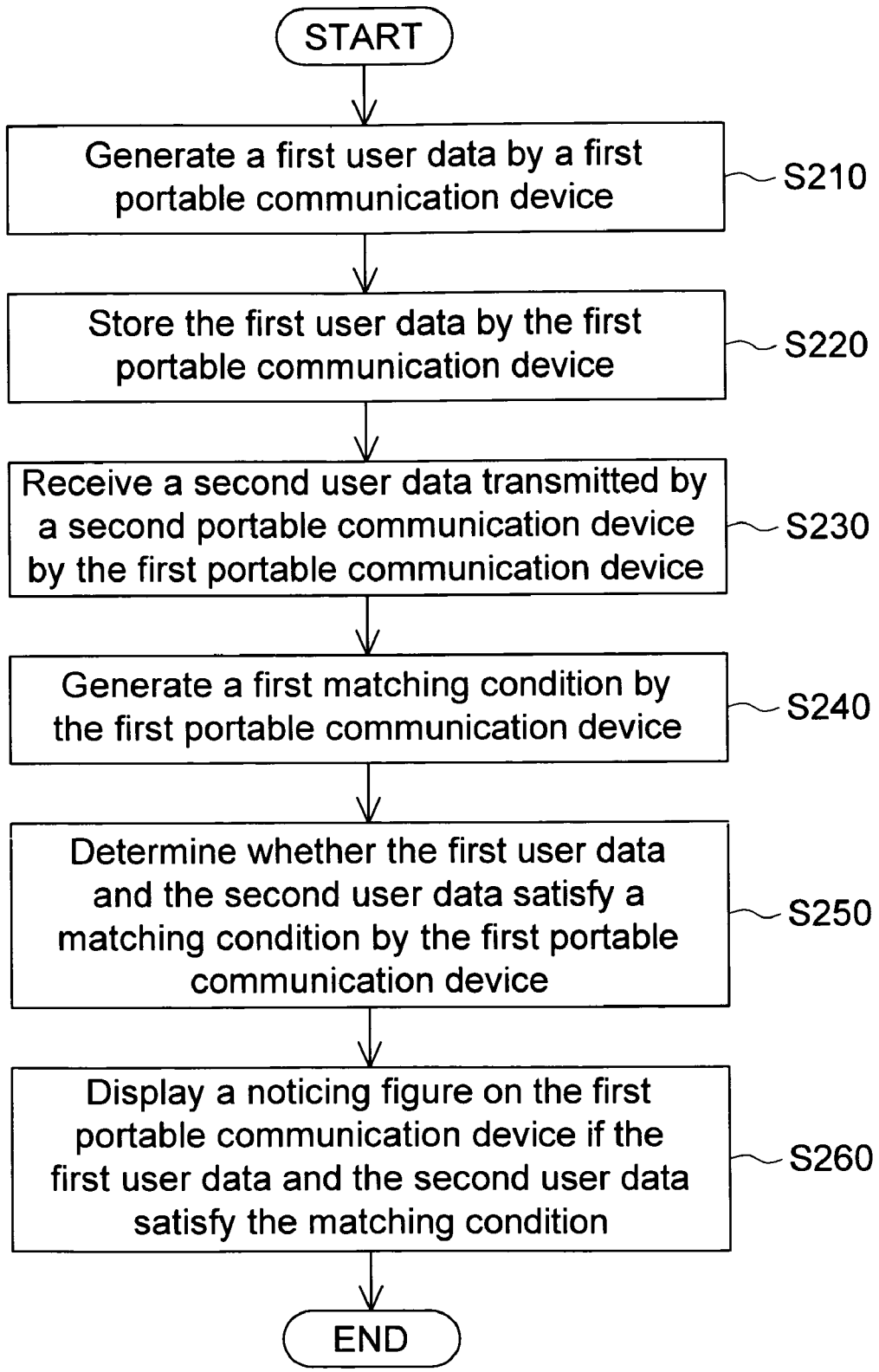
FIG. 2 shows an example of a flowchart of a communication method having a matching function according to a preferred embodiment of the invention.

Referring to FIG. 2, an example of a flowchart of a communication method having a matching function according to a preferred embodiment of the invention is shown. In the communication method having a matching function of the present embodiment of the invention, the portable communication system 100 having a matching function of FIG. 1 is used to execute each step of FIG. 2, but the invention is not limited thereto. Any one who is skilled in the technology will understand that the steps and orders in the communication method having a matching function can be modified and adjusted according to actual needs.

Firstly, the method begins at step S210, a first portable communication device 110 is capable of generating a first user data D1. The user A of the first portable communication device 110 operates the first operating interface 111 to generate the first user data D1.

Next, the method proceeds to step S220, the first portable communication device 110 is capable of storing the first user data D1. In step S220, the first storage unit 115 of the first portable communication device 110 is capable of storing the first user data D1.

Then, the method proceeds to step S230, the first portable communication device 110 is capable of receiving a second user data D2 transmitted by the second portable communication device 120. The first wireless communication module 112 of the first portable communication device 110 receives the second user data D2 transmitted by the second wireless communication module 122 of the second portable communication device 120 by a short distance point-to-point wireless communication mode. The short distance point-to-point wireless communication mode conforms to Bluetooth transmission protocol.

After that, the method proceeds to step S240, the first portable communication device 110 is capable of generating a first matching condition. The user A operates the first operating interface 111 of the first portable communication device 110 to set the first matching condition. Besides, the step of generating the first matching condition can be executed concurrently with the step of generating the first user data D1. That is, step S220 and step S210 can be executed at the same time.

Then, the method proceeds to step S250, the first portable communication device 110 is capable of determining whether the first user data D1 and the second user data D2 satisfy the first matching condition. In step S250, the first determining unit 113 of the first portable communication device 110 is capable of determining whether the matching condition is satisfied.

Lastly, the method proceeds to step S260, a first noticing figure is displayed on the first portable communication device 110 if the first user data D1 and the second user data D2 satisfy the first matching condition. The first noticing figure is displayed on the first displaying unit 114 of the first portable communication device 110.

Furthermore, the first user data D1 includes many first data items, and the second user data D2 includes many second data items. In step S250, the first portable communication device 110 compares each of the first data items with a corresponding second data items to determine whether the corresponding second data item satisfies the corresponding matching item. Besides, in step S260, the first portable communication device 110 displays the corresponding noticing figure such as a one-heart pattern or a four-heart pattern according to the number of the second data items satisfying the corresponding matching item.

According to the portable communication device having a matching function and the portable communication system and communication method thereof disclosed in the above embodiment of the invention, a wireless communication module of the portable communication device is capable of receiving a second user data transmitted by another portable communication device. If the first user data and the second user data satisfy a first matching condition, a first noticing figure is displayed on the first portable communication device to remind the user of the first portable communication device that another user who satisfies the first matching condition is nearby. Thus, with the use of the portable communication device, the user of the portable communication device can have more opportunities to interact with another user of the portable communication device. Besides, the user can set different matching condition according to different preferences to satisfy the users individual needs. Moreover, the invention makes the application of the portable communication device more interesting and diversified.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable communication device having a matching function, the portable communication device comprising:
    an operating interface capable of generating a first user data;
    a wireless communication module capable of receiving a second user data transmitted by another portable communication device;
    a determining unit capable of comparing and determining whether the first user data and the second user data satisfy a matching condition; and
    a displaying unit capable of showing a noticing figure if the first user data and the second user data satisfy the matching condition.

2. The portable communication device having a matching function according to claim 1, wherein the operating interface is further capable of generating the matching condition.

3. The portable communication device having a matching function according to claim 1, wherein, the first user data comprises a plurality of first data items, the second user data comprises a plurality of second data items, the matching condition comprises a plurality of matching items, the determining unit further compares each of the first data items with the corresponding second data item to determine whether the corresponding second data item satisfies the corresponding matching item, the noticing figure is one of a plurality of predetermined patterns respectively corresponding to the number of the second data items satisfying the corresponding matching item.

4. The portable communication device having a matching function according to claim 1, further comprising:
    a storage unit capable of storing the first user data.

5. The portable communication device having a matching function according to claim 1, wherein the first user data comprises at least one of hobby, marriage status, age and gender.

6. The portable communication device having a matching function according to claim 1, wherein the other portable communication device is near to the portable communication device.

7. The portable communication device having a matching function according to claim 1, wherein the wireless communication module is a short distance point-to-point wireless transmission module.

8. The portable communication device having a matching function according to claim 1, wherein the wireless communication module is a Bluetooth module.

9. The portable communication device having a matching function according to claim 1, wherein the portable communication device is a mobile phone.

10. A portable communication system having a matching function, the portable communication system comprising:
    a first portable communication device, comprising:
        a first operating interface capable of generating a first user data;

a first wireless communication module;
a first determining unit; and
a first displaying unit; and
a second portable communication device, comprising:
a second operating interface capable of generating a second user data; and
a second wireless communication module capable of transmitting the second user data to the first wireless communication module of the first portable communication device, wherein the first determining unit is capable of determining whether the first user data and the second user data satisfy a first matching condition, and the first displaying unit is capable of showing a first noticing figure if the first user data and the second user data satisfy the first matching condition.

11. The portable communication system having a matching function according to claim 10, wherein the first operating interface is further capable of generating the first matching condition.

12. The portable communication system having a matching function according to claim 10, wherein the first user data comprises a plurality of first data items, the second user data comprises a plurality of second data items, the first matching condition comprises a plurality of matching items, the first determining unit further compares each of the first data items with the corresponding second data items to determine whether the corresponding second data items satisfy the corresponding matching item, the first noticing figure is one of a plurality of predetermined patterns respectively corresponding to the number of the second data items satisfying the corresponding matching item.

13. The portable communication system having a matching function according to claim 10, wherein the second wireless communication module is further capable of receiving the first user data transmitted by the first wireless communication module, the second portable communication device further comprises:
a second determining unit capable of determining whether the first user data and the second user data satisfy a second matching condition; and
a second displaying unit capable of showing a second noticing figure if the first user data and the second user data satisfy the second matching condition.

14. The portable communication system having a matching function according to claim 13, wherein the second operating interface is further capable of generating the second matching condition.

15. The portable communication system having a matching function according to claim 13, wherein the first user data comprises a plurality of first data items, the second user data comprises a plurality of second data items, the second matching condition comprises a plurality of matching items, the second determining unit further compares each of the second data items with the corresponding first data item to determine whether the corresponding first data items satisfy the corresponding matching item, the second noticing figure is one of a plurality of predetermined pattern respectively corresponding to the number of the first data items satisfying the corresponding matching item.

16. The portable communication system having a matching function according to claim 10, wherein the first portable communication device further comprises a first storage unit capable of storing the first user data, and the second portable communication device further comprises a second storage unit capable of storing the second user data.

17. The portable communication system having a matching function according to claim 10, wherein the first user data and the second user data respectively comprise at least one of hobby, marriage status, age and gender.

18. The portable communication system having a matching function according to claim 10, wherein the second portable communication device is near to the first portable communication device.

19. The portable communication system having a matching function according to claim 10, wherein the first wireless communication module and the second wireless communication module both are short distance point-to-point wireless transmission modules.

20. The portable communication system having a matching function according to claim 10, wherein the first wireless communication module and the second wireless communication module both are Bluetooth modules.

21. The portable communication system having a matching function according to claim 10, wherein the first portable communication device and the second portable communication device both are mobile phones.

22. A communication method having a matching function, the communication method being used in a first portable communication device, the first portable communication device comprising an operating interface, a wireless communication module, a determining unit, and a displaying unit, the communication method comprising:
(a) generating a first user data by the operating interface of the first portable communication device;
(b) receiving a second user data transmitted by a second portable communication device by the wireless communication module of the first portable communication device;
(c) determining whether the first user data and the second user data satisfy a matching condition by the determining unit of the first portable communication device; and
(d) displaying a noticing figure on the displaying unit of the first portable communication device if the first user data and the second user data satisfy the matching condition.

23. The communication method having a matching function according to claim 22, wherein in the step (b), the first portable communication device receives the second user data transmitted by the second portable communication device by a short distance point-to-point wireless communication mode.

24. The communication method having a matching function according to claim 22, wherein in the step (b), the first portable communication device receives the second user data transmitted by the second portable communication device according to Bluetooth transmission protocol.

25. The communication method having a matching function according to claim 22, wherein the step (a) comprises:
generating the matching condition by the first portable communication device.

26. The communication method having a matching function according to claim 22, wherein before the step (c), the method further comprises:
generating the matching condition by the first portable communication device.

27. The communication method having a matching function according to claim 22, wherein the first user data comprises a plurality of first data items, the second user data comprises a plurality of second data items, the matching condition comprises a plurality of matching items, the step (c) compares each of the first data items with the corresponding second data items to determine whether the corresponding second data item satisfies the corresponding matching item.

28. The communication method having a matching function according to claim 27, wherein in the step (d), the noticing figure being one of a plurality of predetermined patterns is displayed according to the number of the second data items satisfying the corresponding matching item.

29. The communication method having a matching function according to claim 22, further comprises:
storing the first user data by the first portable communication device.

30. The communication method having a matching function according to claim 22, wherein the first user data comprises at least one of hobby, marriage status, age and gender.

* * * * *